(12) United States Patent
Tanaka et al.

(10) Patent No.: US 6,862,390 B2
(45) Date of Patent: Mar. 1, 2005

(54) OPTICAL FIBER DROP CABLE

(75) Inventors: Shimei Tanaka, Sakura (JP); Masahiro Kusakari, Sakura (JP); Kazunaga Kobayashi, Sakura (JP); Keiji Ohashi, Sakura (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 10/612,940

(22) Filed: Jul. 7, 2003

(65) Prior Publication Data

US 2004/0161211 A1 Aug. 19, 2004

(30) Foreign Application Priority Data

Aug. 5, 2002 (JP) .................................... 2002-227217

(51) Int. Cl.[7] .............................................. G02B 6/44
(52) U.S. Cl. .................................................... 385/113
(58) Field of Search ........................ 385/113, 100–114; 607/36, 93

(56) References Cited

U.S. PATENT DOCUMENTS 5,851,221 A * 12/1998 Rieder et al. ................. 607/93
5,897,578 A * 4/1999 Wiklund et al. .............. 607/36
5,919,215 A * 7/1999 Wiklund et al. .............. 607/36
6,205,358 B1 * 3/2001 Haeg et al. ................... 607/36

* cited by examiner

Primary Examiner—J. F. Duverne
(74) Attorney, Agent, or Firm—Oblon, Spivak, McClelland, Maier & Neustadt, P.C.

(57) ABSTRACT

An optical fiber drop cable is provided with a neck portion in which an optical element section and a cable support section may be separated readily. The optical fiber drop cable 1 comprises the optical element section 9 including an optical fiber core wire 3, at least one pair of first tensile strength bodies 5 disposed in parallel to said optical fiber core wire in between, said optical fiber core wire and said first tensile strength bodies being covered with a cable sheath 7, and the cable support section 15 including a second tensile strength body 11 covered with a sheath 13, and the optical element section 9 and the cable support section 15 being fixed in parallel to each other via a neck portion 17. The neck portion 17 includes a thick part 25 formed on the cable support section 15 side and a thin part 23, which is thinner than the thick part 25, formed on the optical element section 9 side next to the thick part 25.

16 Claims, 3 Drawing Sheets

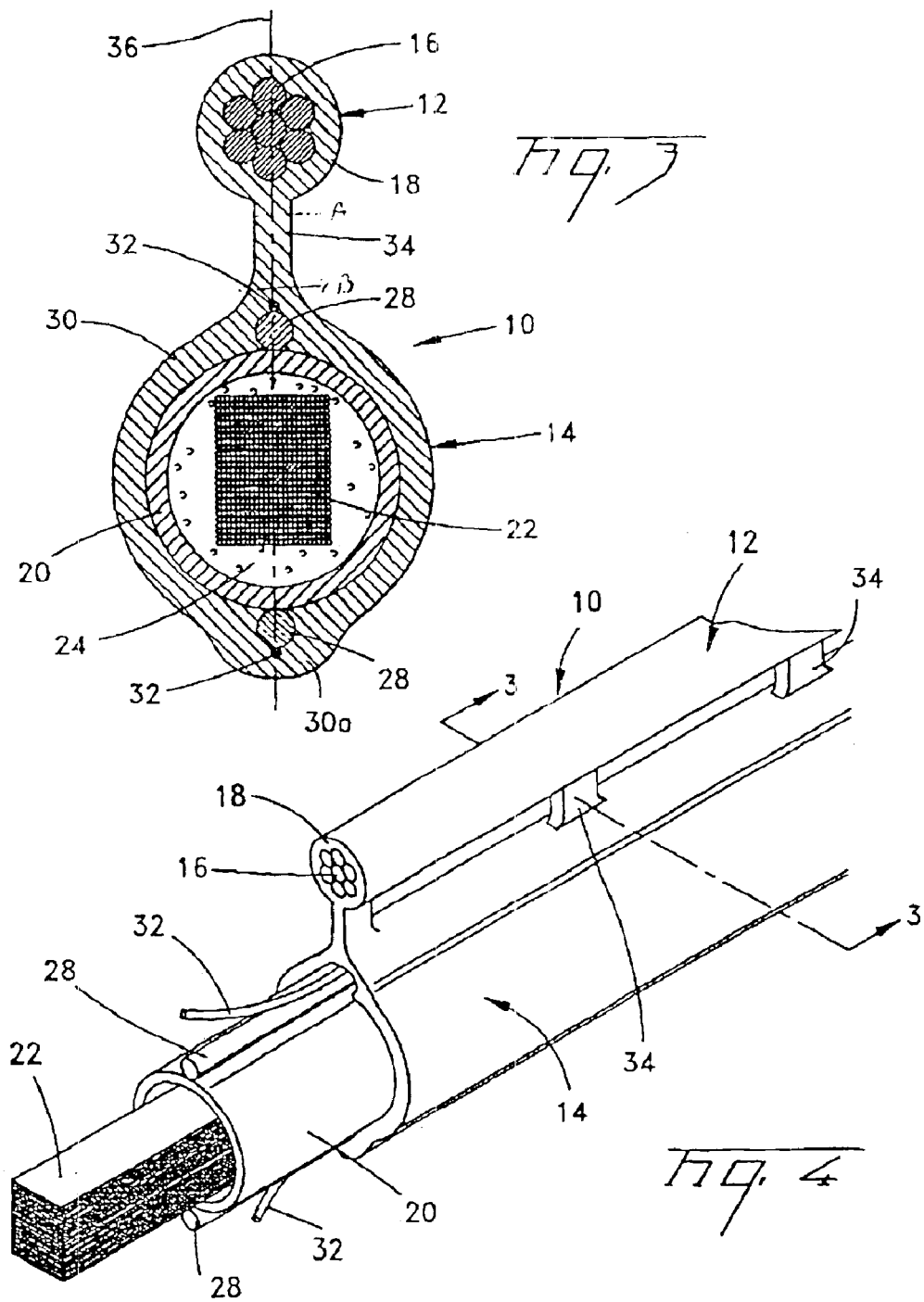

OPTICAL FIBER DROP CABLE

BACKGROUND OF THE INVENTION

1. Field of the Invention

This invention is related to an optical fiber drop cable which is used when optical fibers are dropped from an optical fiber cable to houses or the like.

2. Description of Relevant Art

Up until now, for purposes of FTTH (Fiber to the Home), in order to transmit and receive high speed broadband information such as very high speed data at home or the office, the optical fiber must be pulled from the optical fiber cable of the access system, which is extending from the telephone office, into subscribers' homes such as buildings or general houses. The optical fiber drop cable is used as the optical fiber cable which is preferable for this wiring. That is, the optical fiber drop cable (outdoor fiber cable) is a cable which is used when bringing in optical fibers from a telephone pole into a house.

With reference to FIG. 1, the optical fiber drop cable 101 comprises an optical element section 109 and a cable support section 115. The optical element section 109 includes an optical fiber tape core wire 103 (or optical fiber core wire), which consists of four core optical fibers, a pair of tensile strength bodies 105 disposed on both sides of the optical fiber tape core wire 103 in parallel, which consist of electroconductivity metal wire, for example, 0.4 mm diameter steel wires, and a cable sheath 107 covering them, which is made of thermoplastic resin such as PVC and flame-retardant PE. The cable support section 115 includes a support wire 111 consisting of a metal wire such as a steel wire 1.2 mm in diameter, and a sheath 113 covering the support wire 111, which is made of thermoplastic resin such as PVC and flame-retardant PE. The optical element section 109 and the cable support section 115 are parallel to each other and connected as one body via a narrowed neck portion 117. In the cable sheath 107, a notch 119 is provided on each side of the upper and lower direction (y direction) in FIG. 1 to take out the tape core wire 103.

With reference to FIGS. 2A, 2B and 2C, the shape of the neck portion 117 is as shown in the figure, and the width (x direction size) of the neck portion 117 is 0.2–0.4 mm. In FIG. 2A, the neck portion 117 has flat sides which are parallel to the x direction, and the thickness (y direction size) of the neck portion 117 is 0.15–0.35 mm. In FIG. 2B, the neck portion 117 has a constricted shape, where the joint thickness of the cable support section 115 side and the optical element section 109 side is 0.7–0.8 mm and the thickness about the central portion is 0.15–0.35 mm. In FIG. 2C, the joint thickness at the cable support section 115 side is 0.7–0.8 mm and is shaped slanted towards the joint thickness 0.15–0.35 mm of the optical element 109 side.

With reference to FIG. 3 which shows the production line for producing optical fiber drop cable 101, wherein the tape core wire 103, tensile strength bodies 105, and support wire 111 are each supplied by bobbins 121, 123, 125 and sent to an extrusion head 131 of an extrusion machine 129 via a branch line board 127. On both sides of the tape core wire 103, the tensile strength bodies 105 are placed in parallel and supplied to the prescribed position in the extrusion head 131. The support wire 111 is also supplied to the prescribed position in the extrusion head 131.

The thermoplastic resin used commonly as the cable sheath 107, 113 and the neck portion 117 is extruded into the extrusion head 131 for extrusion covering together. That is, at the same time when the tape core wire 103 and the tensile strength bodies 105 are covered with the cable sheath 107, and the support wire 111 is covered with the sheath 113 inside the extrusion head 131, the cable sheath 107 and sheath 113 are connected as one body by the neck portion 117.

With referring to FIG. 4, so that the tape core wire 103 of the optical fiber drop cable 101 is pulled from the optical fiber cable 133 extending from the telephone office, into each building or house, the optical element section 109 and the cable support section 115 are separated by partially splitting the neck portion 117 of both ends of the optical fiber drop cable 101. One end 115A of the cable support section 115 is fastened to a telephone pole 135 by an outdoor clamp 137, and the other end 115B is fastened to a part of the house by the clamp 137.

By use of the notch 119 of the optical element section 109, the cable sheath 107 of one end 109A of said optical element section 109 is cut away, and the tape core wire 103 is pulled out to be connected to a cable branching box (cable closure) 139 on the telephone pole 135. For the other end 109B, the cable sheath 107 is cut away by use of the notch 119 of the optical element 109, and the tape core wire 103 is pulled out to be connected to an OE converter or termination box 141 inside the house.

Now, in case of said optical fiber drop cable 101 or other conventional optical fiber drop cable has the size and shape of neck portion 117 which are the same as shown in FIGS. 2A–2C, there was a problem of adherence of the optical element section 109 and the cable support section 115 in manufacturing the cable 101, which is difficult to separate. This posed a problem in that it diminished the quality of work when laying a cable.

There was also the problem of the exposure of the support wire 111 when the optical element section 109 and the cable support section 115 were separated.

SUMMARY OF THE INVENTION

This invention was made to solve the problem mentioned above. The object of the invention is to provide an optical fiber drop cable which has a neck portion wherein the optical element section and the cable support section may be readily cut apart.

In order to achieve the object, according to an aspect of the invention, an optical fiber drop cable comprises an elongated optical element section including an optical fiber core wire, and on both sides of the optical fiber core wire at least one pair of first tensile strength bodies which are covered with a cable sheath, and an elongated cable support section where a second tensile strength body is covered by a sheath, and the optical element section and the cable support section are laid parallel and fixed at a neck portion, the optical fiber drop cable is characterized in that the neck portion includes a thick part on said cable support section side and a thin part thinner than said thick part, on said optical element section side adjacent to said thick part.

Therefore, the cable support section and the optical element section may be cut apart readily, thus suppressing curling of the optical element section and improving wiring work efficiency, for example in putting said optical element section into the cable closure.

Additionally, as the cable support section and the optical element section may be detached easily, the thinning of the sheath of the cable support section when they are separated will be avoided, and thus the exposure of the support wire may be avoided.

Preferably, said thin part has a width of 0.1–0.2 mm and a thickness of 0.2–0.4 mm.

Therefore by optimizing the measurements of the thin part as described above, the breaking off of the neck portion during a mechanical test, bad tear-off properties, and such problems may be avoided. Additionally, as the longitudinal size may be prevented from becoming too large, good mechanical characteristics and reliability when exposed to wind pressure load may be assured.

BRIEF DESCRIPTION OF THE ACCOMPANYING DRAWINGS

The above and further objects and novel features of the present invention will become fully apparent from the following detailed description when the same is read in conjunction with the accompanying drawings, in which:

FIG. 3 is an outline explanatory figure showing the manufacture line of conventional optical fiber drop cables;

FIG. 4 is an explanatory figure showing an enforcement state of conventional cables;

DETAILED DESCRIPTION OF PREFERRED EMBODIMENTS

In the following description, the embodiment of this invention will be explained with reference to the drawings.

Figure 5:
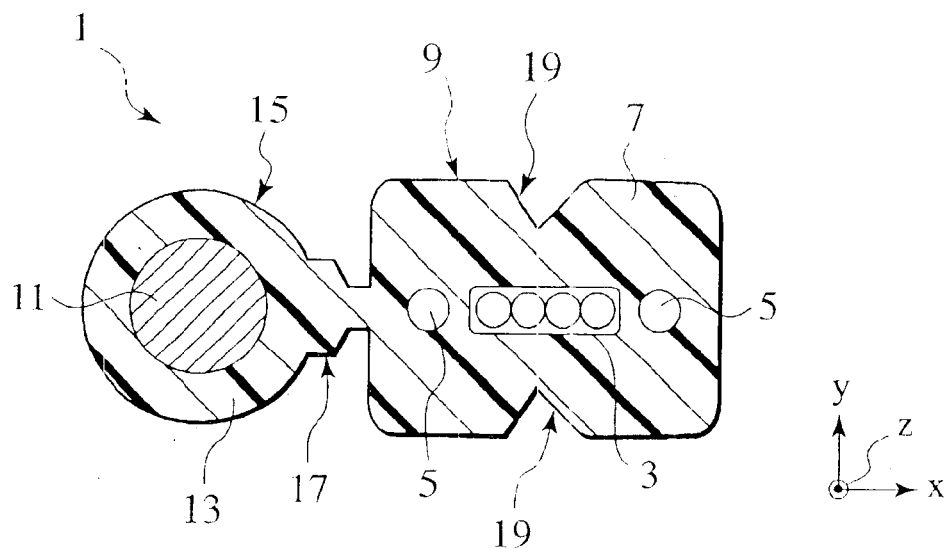
FIG. 5 is a cross-sectional view of an optical fiber drop cable according to an embodiment of the present invention.

Referring to FIG. 5, the optical fiber drop cable 1 of this embodiment comprises an optical element section 9 and a cable support section 15. The optical element section 9 includes an optical fiber tape core wire 3 (hereinafter referred to as "tape core wire") including at least one optical fiber covered with resin, a pair of first tensile strength bodies 5 disposed on both sides (the left and right sides in FIG. 5) of the tape core wire 3, and a cable sheath 7 covering the tape core wire 3 and the first tensile strength bodies 5. The tape core wire 3 may be an optical fiber core wire of different types such as a single core optical fiber. The tensile strength bodies 5 may be conducting metal wires, for example steel wires of diameter 0.4 mm. The cable sheath 7 may be thermoplastic resin such as polyvinylchloride (PVC) or flame-retardant polyethylene (PE). For example, the preferable materials for the cable sheath 7 are the known thermoplastic resin commercially available as PVC7400 made by PLAS-TECH CORPORATION (Head Office Address: 1-1, Kasuminosato, Inashiki-Gun, Ibaraki-Pref., 300-0315, JAPAN), CA-1150BM and CA-1155B made by JAPAN PORYOLEFINS Co., Ltd (Head Office Address: Toranomon 17 Mori Bldg.3F, 26-5, Toranomon 1-chome, Minato-ku, Tokyo 105-001, JAPAN).

The cable support section 15 includes a support wire 11 as a second tensile strength body, and a sheath 13 covering the support wire 11. The support wire 11 may be a metal wire, for example 1.2 mm diameter steel wire. The sheath 13 may be resin similar to that of the cable sheath 7.

The optical element section 9 and the cable support wire section 15 are connected in parallel as one body by the constricted (narrowed) neck portion 17. The optical fiber drop cable 1 is provided with notches 19 on upper and lower surfaces of the cable sheath 7 of FIG. 5. With the notches 19, the cable sheath 7 can be easily cut or broken there between to expose the core wire 3.

Figure 6:
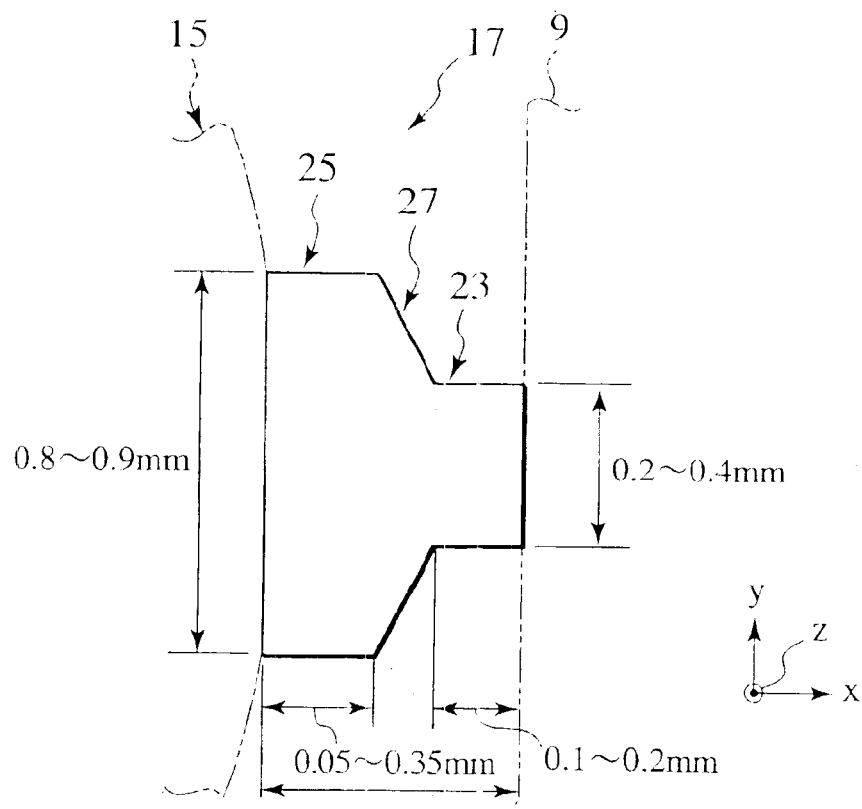
FIG. 6 is a sectional view showing a shape of the neck portion of the optical fiber drop cable according to the embodiment of the present invention.

Referring to FIG. 6, said neck portion 17 has a shape as shown in the figure, and the total width (x direction size) of the neck portion 17 is 0.3–0.6 mm. The neck portion 17 includes a thick part 25 on the cable support section 15 side, which is 0.05–0.35 mm in width, and a thin part 23 on the optical element portion 9 side, which is thinner (smaller in y direction size) than the thick part 25 and 0.1–0.2 mm in width.

In more detail, the thick part 25 is 0.8–0.9 mm in thickness (y direction size), and the thin part 23 is 0.2–0.4 mm in thickness. The neck portion 17 may include an inclined part 27 between the thick part 25 and the thin part 23 for connecting them. The inclined part 27 has a shape wherein the thickness becomes thinner from the thick part 25 to the thin part 23.

The manufacture of the optical fiber drop cable 1 of the embodiment is made by extrusion, generally similar to the conventional production method explained formerly. For example, an extrusion head with a nipple which has a pass-through hole of the shape of the said neck portion 17 is used in extrusion.

Figure 1:
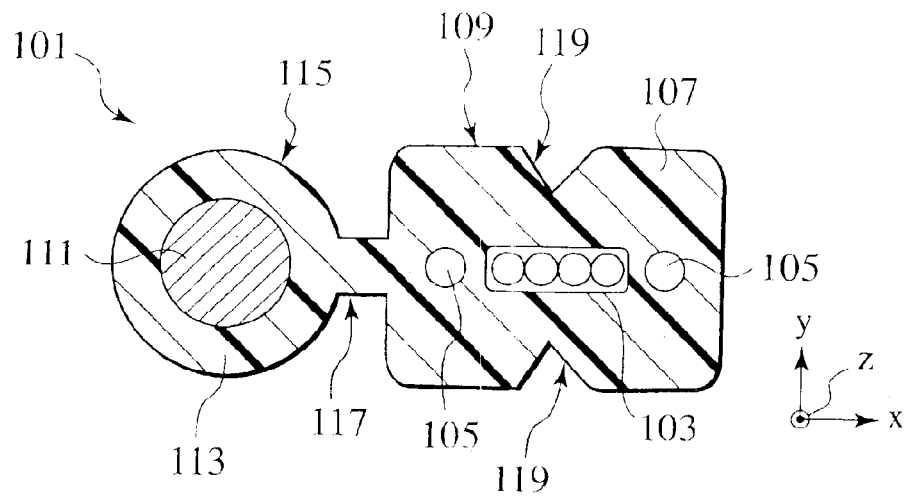
FIG. 1 is a cross-sectional view of a conventional optical fiber drop cable.
Figure 2A:
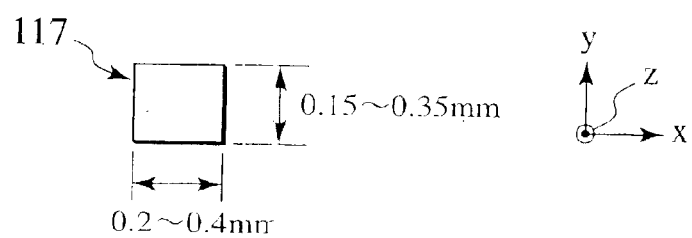
FIGS. 2A–2C are sectional views of various shapes of the neck portion of conventional optical fiber drop cables.
Figure 2B:
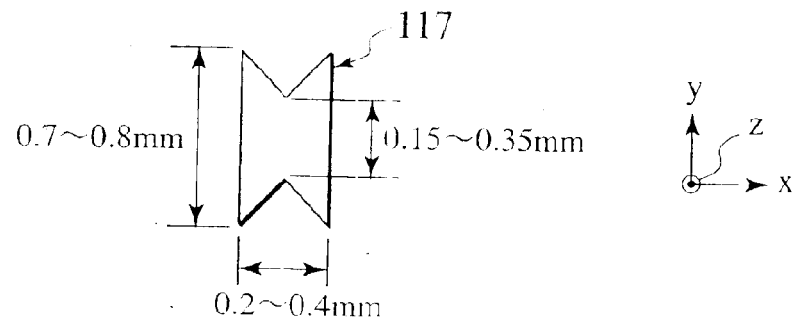
Figure 2C:
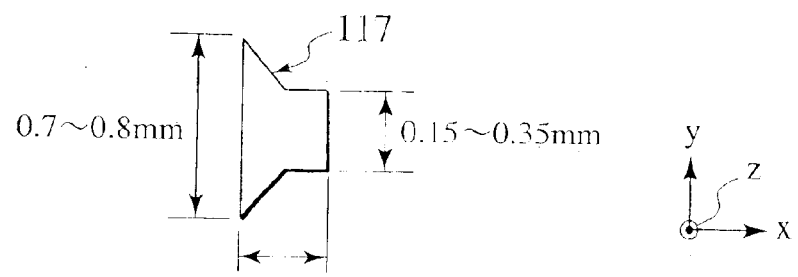

In order to evaluate the effect of the construction of the optical fiber drop cable 1 of the embodiment of this invention, optical fiber drop cables 1 and 101 were produced experimentally with the neck portion 117 of conventional shape and with the neck portion 17 of the shape of this embodiment, and a characteristics evaluation thereof was carried out. The result is shown in Table 1. In Table 1, the cable 1 of the embodiment is called the "shape of the invention", the cable 101 with a neck portion 117 as shown in FIG. 2A is called the "conventional shape 1", the cable 101 with a neck portion 117 as shown in FIG. 2B is called the "conventional shape 2", and the cable 101 with a neck portion 117 shown in FIG. 2C is called the "conventional shape 3".

TABLE 1

| | Neck portion shape of the cable | | | |
| Evaluation Items | shape of the invention | conventional shape 1 | conventional shape 2 | conventional shape 3 |
| --- | --- | --- | --- | --- |
| Mechanical Characteristics | ◯ | Δ | ◯ | ◯ |
| Support section detachment property | ◯ | Δ | Δ | Δ |

TABLE 1-continued

| | Neck portion shape of the cable | | | |
|---|---|---|---|---|
| Evaluation Items | shape of the invention | conventional shape 1 | conventional shape 2 | conventional shape 3 |
| Degree of exposure of suport wire when support section is detached | ○ | Δ | X | X |
| Radius of curvature of optical element section when support section is detached | ○ | X | X | X |

In the "mechanical characteristics of the evaluation item" in Table 1, when side pressure, bend, twist, and shock are applied to optical fiber drop cable 1, 101, when the neck portion 17, 117 did not break at all, it is marked ○, partially broken is marked Δ, and broken over the whole length is marked X.

In the "support section detachment property" of the evaluation items, for the maximum tensile force to detach the cable support section 15, 115 and the optical element section 9, 109, below 9.8N (1.0 kgf) is marked ○, 9.8–19.6N (1.0–2.0 kgf) is marked Δ, and over 19.6N (2.0 kgf) is marked X.

In the "degree of exposure of support wires when support section is detached" of the evaluation item, the case where the support wires 11, 111 are not exposed at all when the cable support section 15, 115 and optical element section 9, 109 are detached is marked ○, the case when exposed according to the method of detachment is marked Δ, and the case when exposed no matter the method of detachment is marked X.

In the "radius of the curvature of optical element portion when support section is detached" (in other words, the degree of the curl of the optical element portion) of the evaluation item, when the cable support section 15, 115 and optical element section 9, 109 are detached, when the radius of curvature of the optical element section 9, 109 is larger than 100 mm it is marked ○, 50–100 mm marked Δ and smaller than 50 mm marked X.

As shown in Table 1, as for the shape of this invention, with the thin part 23 provided next to the thick part 25, all the evaluation item marks are good. As the cable support section 15 and the optical element section 9 may be separated readily, the curling of the optical element section 9 is suppressed when separated and workability of wiring, for example, putting the optical element section into the cable closure, may be improved.

Also, as the cable support section 15 and optical element section 9 may be separated readily, the thinning of sheath 13 of the cable support section 15 when being separated will vanish, and the exposure of the support wire 11 as seen in conventional shapes 1, 2, 3 may be avoided.

Additionally, by optimizing the measurements of the thick part 25 and thin part 23, the breaking off of the neck portion 17 when mechanical tests are conducted, inferior tear-off properties, and such problems may be avoided. As the longitudinal size may be prevented from becoming too large, optical fiber drop cable 1 which ensures good mechanical characteristics and reliability when facing wind pressure loading, may be manufactured.

In addition to the evaluation of Table 1, in order to optimize the size of the neck portion 17 of the optical fiber drop cable 1 of the embodiment, optical fiber drop cables 1 with various thicknesses and widths of the thin part 23 were produced experimentally, and characteristics evaluation thereof was carried out. The results are shown in Table 2 and Table 3.

TABLE 2

| | Thickness of thin part of the neck portion of the invention | | | | | |
|---|---|---|---|---|---|---|
| Evaluation Items | 0.15 mm | 0.19 mm | 0.20 mm | 0.40 mm | 0.41 mm | 0.45 mm |
| Mechanical Characteristics | X | Δ | ○ | ○ | ○ | ○ |
| Support section detachment property | ○ | ○ | ○ | ○ | Δ | X |
| Radius of curvature of optical element section when support section is detached | ○ | ○ | ○ | ○ | Δ | X |

TABLE 3

| | Width of thin part of the neck portion of the invention | | | | | |
|---|---|---|---|---|---|---|
| Evaluation Items | 0.05 mm | 0.09 mm | 0.10 mm | 0.20 mm | 0.21 mm | 0.25 mm |
| Support section detachment property | X | Δ | ○ | ○ | ○ | ○ |
| Radius of curvature of optical element section when support section is detached | X | Δ | ○ | ○ | ○ | ○ |
| Wind pressure load | ○ | ○ | ○ | ○ | X | X |

In the evaluation item of Table 2 and Table 3, the "mechanical characteristics", "support section detachment property" and "radius of curvature of optical element section when support section is detached" are of the same standard as in Table 1.

In the "wind pressure load" of the evaluation item, when wind pressure load is assumed to be 100 kgf/m$^2$ (first grade wind pressure load), the safety coefficient of the support wire 11 less than 2 is marked X and over 2 marked ○.

As shown in Table 2 and Table 3, when the thickness of thin part 23 is 0.2–0.4 mm, good results are obtained for all evaluation items, and when the width of the thin part 23 is 0.1–0.2 mm, good results are obtained for all evaluation items.

Therefore, in the optical fiber drop cable 1, it is desirable to have the width of the thin part 23 of the neck portion 17 to be 0.1–0.2 mm, and the thickness to be 0.2–0.4 mm.

As understood from the explanation of the embodiment of the invention, according to the invention, as the cable support section and the optical element section may be readily separated, the curling of the separated optical element section may be suppressed, and workability of wiring, for example, storage in the cable closures, may be improved.

Further, as the cable support section and the optical element section may be separated easily, when they are separated, the sheath of the cable support section will not get thin, and the support wire will not be exposed.

According to the invention, by optimizing the measurements of the thin part, severance of the neck portion when mechanical tests are conducted, inferior tear-off properties, and such problems may be avoided. Moreover, as the longitudinal size is prevented from becoming too large, optical fiber drop cables which ensure reliable mechanic characteristics and reliability when experiencing wind pressure loading, may be manufactured.

The present application claims the benefit of priority based on Japanese Patent Application No. 2002-227217, filed on Aug. 5, 2002, in the Japanese Patent Office, of which whole contents are incorporated herein by reference.

While the preferred embodiment of the present invention has been described using specific terms, such description is for illustrative purposes, and it is to be understood that changes and variations may be made without departing from the spirit or scope of the following claims.

What is claimed is:

1. An optical fiber drop cable comprising:
   an optical element section including an optical fiber, at least one pair of first strength members disposed in parallel with the optical fiber in between, and a first cable sheath that covers said optical fiber and said first strength members;
   a cable support section including a second strength member and a second cable sheath that covers said second strength member; and
   a neck portion that connects said optical element section and said cable support section in parallel to each other, wherein
   said neck portion includes a thick part disposed on the side of said cable support section, and a thin part, which is thinner than said thick part, disposed on the side of said optical element section, and wherein said neck portion further includes a step formed between said thick part and thin part.

2. An optical fiber drop cable according to claim 1, wherein said thin part has a width 0.1–0.2 mm and thickness 0.2–0.4 mm.

3. An optical fiber drop cable according to claim 2, wherein said thick part has a width 0.05–0.35 mm and thickness 0.8–0.9 mm.

4. An optical fiber drop cable according to claim 3, wherein the first cable sheath, the second cable sheath and the neck portion are made of common thermoplastic resin as one body.

5. An optical fiber drop cable comprising,
   a cable sheath which is made of thermoplastic resin, and which includes
      an optical fiber housing section covering an optical fiber and a pair of strength members disposed on opposite sides of said optical fiber in the x direction, and having a pair of V shaped notches formed on opposite surfaces in the y direction,
      a support wire housing section covering a support wire, and disposed in parallel to said optical fiber housing section in the x-z plane; and
      a neck portion that connects said optical fiber housing section and said support wire housing section, wherein
   said neck portion includes
      a thin part formed on the optical fiber housing section side and having a generally even dimension in the y direction, and
      a thick part formed on the support wire housing section side and having a generally even dimension in the y direction which is larger than the thin part, and wherein
   said neck portion further includes a step formed between said thick part and thin part.

6. An optical fiber drop cable according to claim 5, wherein the thin part has dimensions of 0.1–0.2 mm in the x direction and 0.2–0.4 mm in the y direction.

7. An optical fiber drop cable according to claim 6, wherein the thick part has dimensions of 0.05–0.35 mm in the x direction and 0.8–0.9 mm in the y direction.

8. An optical fiber drop cable according to claim 7, wherein the thermoplastic resin is polyvinylchloride.

9. An optical fiber drop cable according to claim 7, wherein the thermoplastic resin is flame-resistant polyethylene.

10. An optical fiber drop cable according to claim 5, wherein the neck portion includes an inclined portion formed between the thick part and the thin part, in which the dimension of the y direction decreases from the thick part towards the thin part.

11. An optical fiber drop cable according to claim 10, wherein the thin part has dimensions of 0.1–0.2 mm in the x direction and 0.2–0.4 mm in the y direction.

12. An optical fiber drop cable according to claim 11, wherein the thick part has dimensions of 0.05–0.35 mm in the x direction and 0.8–0.9 mm in the y direction.

13. An optical fiber drop cable according to claim 12, wherein the thermoplastic resin is polyvinylchloride.

14. An optical fiber drop cable according to claim 12, wherein the thermoplastic resin is flame-resistant polyethylene.

15. An optical fiber drop cable comprising:
   an optical element section including an optical fiber, at least one pair of first strength members disposed in parallel with the optical fiber in between, and a first cable sheath that covers said optical fiber and said first strength members;
   a cable support section including a second strength member and a second cable sheath that covers said second strength member; and
   a neck portion that connects said optical element section and said cable support section in parallel to each other, wherein
   said neck portion including a breakable part disposed on the side of said optical element section at which said neck portion is adapted to break when separating said optical element section from said cable support section, and a protective part disposed on the side of said cable support section which prevents said cable support section breaking.

16. An optical fiber drop cable according to claim 1, wherein said neck portion continuously extends along the longitudinal direction of said cable.

* * * * *